Patented Jan. 8, 1952

2,582,188

UNITED STATES PATENT OFFICE

2,582,188

METHOD OF PREPARATION OF TOASTED NUT MEATS

Joseph A. Zaloom, Rutherford, N. J.

No Drawing. Application December 6, 1950, Serial No. 199,556

7 Claims. (Cl. 99—127)

The present invention relates to the processing of nut meats in order to enhance their palatability and keeping qualities.

As conducive to a clear understanding of the invention, it is noted that where they are fried in fat or oil, whether or not they be also salted, nut meats may become soggy or unpalatable by penetration of the frying oil; autocatalytic oxidation of the frying oil and fat on or in the meats may lead to rancidity of the natural oil of the nut and thus render the meats unfit for human consumption; due to the substantial nutritional value of such frying fat or oil, the meats are rendered difficult to digest with likelihood of heartburn, eructation and other systemic disturbance of the consumer; and the product is greasy to the touch and unsatisfactory due to rapid accumulation of dust and germs as the oil coated meats are exposed to air.

It is accordingly among the objects of the invention to provide a method of treating nut meats that will yield a properly toasted product which admits of flavoring the meats with dry salt without subsequent shedding of salt therefrom, which affords a product that retains the natural uncontaminated flavor of the nut; and is more palatable than oil or fat-fried nut meats, which provides a product dry to the touch and of enhanced keeping qualities and which admits, if desired, of incorporating with the nut meats auxiliary agents, such as flavoring, and does not materially enrich the natural food value of the nut or promote such digestive disturbances as may follow the incorporation of objectionable foreign matter such as frying oil with the nut meat.

According to the invention the product resulting from the present invention is a toasted rather than a fried nut meat, to the exterior of which table salt in crystalline form, with or without auxiliary such as flavoring agent, is securely bonded in amount adequate to afford the desired seasoning, the bonding agency being a film of edible adhesive which performs the additional function of closing the pores of the nut meats, and thus hermetically sealing the interior of the nut from the entry of moisture, dirt or other foreign agency that tends to spoil the meat, as by rendering rancid the natural oils therein, and precluding loss by evaporation of volatile components of such natural oils, so that the nut has greatly enhanced keeping qualities and remains crisp and fresh flavored even after long periods of storage.

According to the invention the meats, such as those of the cashew, filbert, almond, pecan, pistachio and Brazil nuts are first toasted, desirably by tumbling the same in a revolving roaster of conventional type that may be heated by a gas flame under its cylinder.

In order to cushion against breakage and to assure uniformity of toasting in the tumbling operation, without burning or charring, the nut meats are desirably mixed with a suitable inert granular, heat transmitting agent that encompasses and separates the individual pieces of nut meat and distributes the heat uniformly thereto. This granular agent may be sand but is preferably granular table salt and desirably is of weight approximately equal to that of the nut meats being toasted. The tumbling operation is desirably conducted at a temperature and for a period of time sufficient to impart to the nut the desired toasted flavor. In practice a temperature of 300 to 350 degrees F. is maintained for a period in the order of 15 to 30 minutes depending on the amount of moisture to be evaporated and the degree of toasting desired. Generally, fifteen (15) minutes of toasting is adequate.

Preferably the mass of granular salt is first raised to the desired temperature of 300 to 350 degrees F. in the roaster before the nut meats are introduced and admixed with the salt, so that each individual piece of nut meat is promptly and uniformly raised to the desired toasting temperature by contact with the preheated salt, and is maintained at that temperature for the period noted.

After the toasting operation has been completed, the nut meats are removed from the roaster, desirably by pouring the same upon a mesh screen which may be shaken to cause the salt to drop therefrom and to be collected for repeated re-use. The clean nut meats, while still hot, are thereupon sprayed with edible adhesive in solution and are agitated during the spraying operation to cause the solution to spread uniformly over the entire outer surface of the nut meats. To this end the meats might be distributed upon revolving pans and agitated as the adhesive spray is applied thereto. Any suitable edible adhesive, such as for instance, edible shellac, dextrin gum, agar agar, carboxy methyl cellulose, methoxy cellulose, ethoxy cellulose, or the like, may be used, but in general it is preferred to use a solution of gum arabic, desirably of one part of gum arabic to three parts of water. Preferably the gum arabic solution is applied in amount of the order of one percent by weight of that of the nut meats to be treated, so that the adhesive-sprayed nut meats will acquire a very thin coating film of the adhesive. By reason of the relatively high viscosity of the gum arabic solution, that film will not enter the pores of the nut to any appreciable degree but will remain upon the nut meats essentially as an outer or covering film, which slightly moistens the surface only of the nut meats.

Thereupon the nut meats, while still hot and moist, are sprinkled with pure table salt. In practice an amount of salt is ordinarily used of approximately 1 to 2, preferably 1.5 percent of the weight of the nut meats being treated. The salt is sprinkled upon the hot adhesive filmed nut meats, while these are agitated (desirably upon the same revolving pans used for applying adhesive to the meats) so that the salt will spread fairly uniformly upon their surfaces and the film of still moist adhesive intervening between the meat and the salt, will cause adhesion therebetween. Upon cooling of the nut meats, the adhesive film dries and securely bonds the salt crystals to the nut meats, which are now ready for packaging and sale.

For best results, it is desirable to effect the cooling rather rapidly, as the flavor may be adversely affected if the nuts are kept hot for too long a period. Accordingly, it is preferred to place the hot treated nuts upon a perforated metal platform over an air duct to which suction is applied for drawing cooling air through the mass of nut meats.

If desired, there may be incorporated upon the nut meats with the solution of the adhesive, soluble desirable preservatives, flavoring extracts or the like, such as ascorbic acid which retards, if it does not entirely prevent, rancidity, or mono-sodium glutamate which aids in developing the true flavor of the toasted nut meats.

The product resulting from the foregoing process is a nut meat, the pores of which are sealed by a thin, dry generally glossy, adhesive film, which serves as the bonding agency of the flavoring salt crystals. The nut meats thus treated are protected by the adhesive film from the entry of moisture and of foreign matter that would promote sogginess or spoilage of the nuts or rancidity of its natural oil. That film also prevents escape of the more or less volatile components of the meats. Accordingly the nut meats will remain fresh flavored, crisp and palatable even after long exposure. The nut meats thus treated are dry to the touch and therefore easy to handle and not subject to the adhesion of dust thereon.

The gum arabic adhesive is a pentosan not accepted by the human organism as a food product, so that its incorporation upon the nut meat for the two purposes noted, namely to seal the pores and to bond the salt thereto, does not in any wise enhance or detract from the food value of the nut.

As many changes could be made in the above method, and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. The method of treating nut meats which comprises the following steps: tumbling the meats in a granular heat transmitting medium until the same are toasted, separating the meats from the granular medium, spraying upon the hot meats a thin surface coat of edible adhesive and while such adhesive is still moist, applying to the nut meats dry table salt in such amount as will adhere to the nut meats and become bonded thereto when the adhesive has dried.

2. The method of treating nut meats which comprises tumbling the same at temperature and for a period of time sufficient to toast the meats to the desired extent, spraying the hot nut meats with sufficient edible adhesive in solution slightly to moisten the surface of the nut meats, and while the surface of the nut meats is still moist applying thereto crystals of table salt in such amount as will adhere to the meats, and thereupon causing the adhesive to dry.

3. The method of treating nut meats which comprises tumbling the same in table salt at a temperature of 300 to 350 degrees F. for a period in the order of 15 to 30 minutes depending on the degree of resultant toasting of the nut meats desired, separating the toasted nut meats from the salt, spraying upon the toasted nut meats a small amount of edible adhesive solution sufficient to moisten the surface of the nut meats, and sprinkling upon the meats dry table salt with resultant adhesion of salt to the meats, and bonding of the same to the meats upon drying.

4. The method of treating nut meats which comprises tumbling the same in approximately an equal amount by weight of table salt while maintaining the same heated to a temperature and for a period of time sufficient to toast the nut meats to the desired extent, separating the nut meats from the salt and while still hot applying thereto gum arabic solution in the order of one per cent by weight of the meats while agitating the same to effect a thin distributed surface film of such solution upon the meats and while the meats are still hot and the gum arabic solution is still moist, sprinkling thereon dry table salt for adhesion to the meats and adhesive bond thereof upon drying of the film.

5. The combination recited in claim 4 in which the table salt is sprinkled upon the toasted meats in amount approximately 50 per cent greater than the amount of gum arabic solution used.

6. The combination recited in claim 4 in which the hot meats are finally cooled by drawing air therethrough, with resultant hardening and drying of the adhesive.

7. The method of treating nut meats which comprises heating a mass of dry table salt to a temperature of 300 to 350 degrees F., introducing into the salt mass, nut meats in amount by weight substantially equal to that of the salt, tumbling the nut meats in the salt for a period in the order of fifteen minutes until the nuts have been toasted to the desired extent, separating the meats from the salt, spraying upon and distributing over the surface of the meats, gum arabic solution in amount approximately one per cent by weight of the nut meats and consisting of approximately one part of gum arabic to three parts of water, and sprinkling upon the nut meats while still hot, pure table salt in amount approximately 1½ per cent that of the weight of the meats, and thereupon drawing cool air through the meats to abstract heat therefrom and promptly to dry the adhesive coating.

JOSEPH A. ZALOOM.

REFERENCES CITED

The following references are of record in the file of this patent:

UNITED STATES PATENTS

| Number | Name | Date |
|---|---|---|
| 2,159,986 | Gray et al. | May 30, 1939 |
| 2,468,078 | Kelly | Apr. 26, 1949 |

OTHER REFERENCES

"Effect of Monosodium Glutamate on Taste of Pure Sucrose and Sodium Chloride," E. E. Lockhart and Jean Murray Gainer, Food Technology, vol. 15, #6, Nov.—Dec., 1950, pp. 459–464.